UNITED STATES PATENT OFFICE.

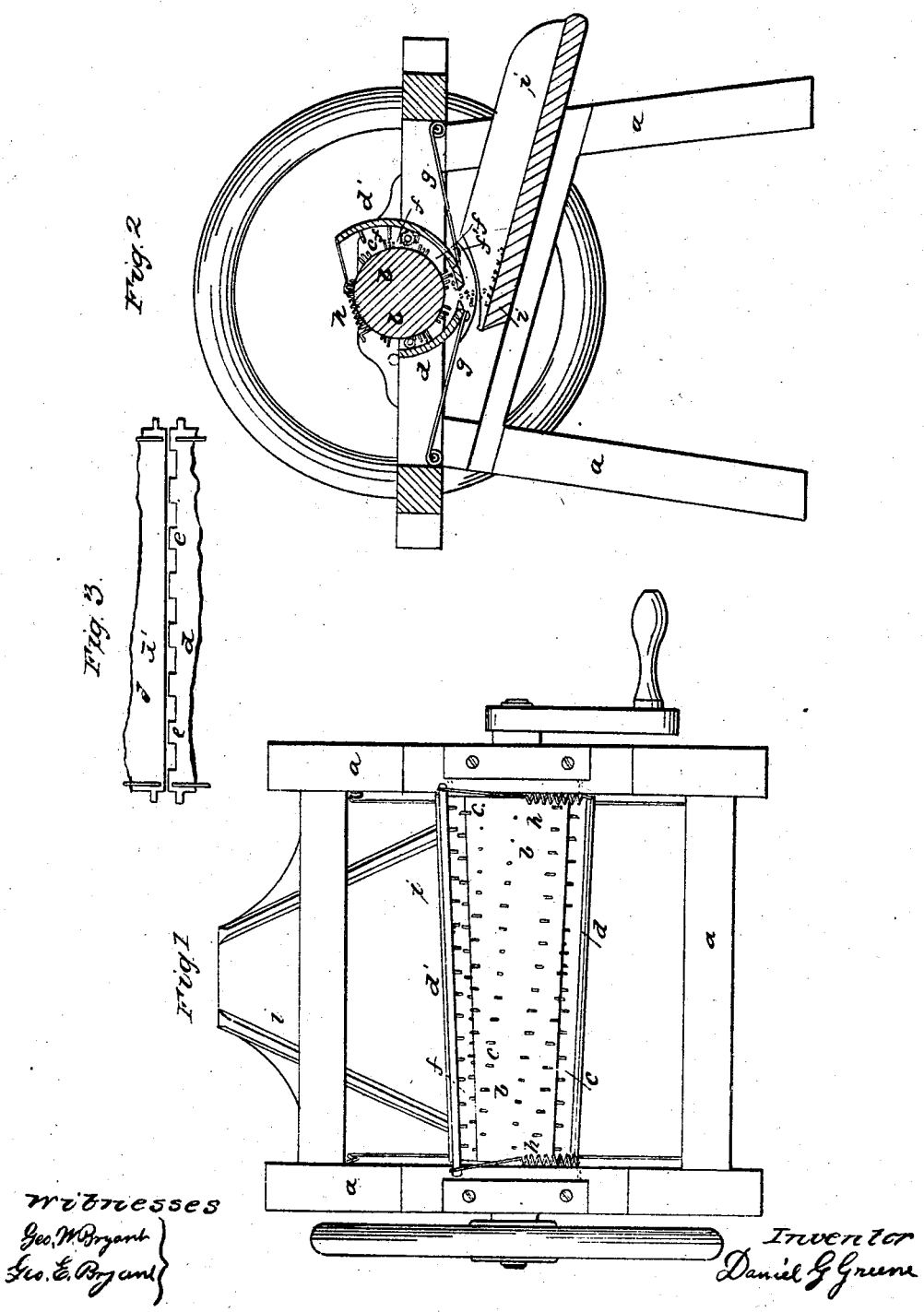

DANIEL G. GREENE, OF NORTH BRIDGEWATER, MASSACHUSETTS, ASSIGNOR TO HIMSELF AND GEO. H. GREENE, OF SAME PLACE.

CORN-SHELLER.

Specification of Letters Patent No. 19,603, dated March 9, 1858.

*To all whom it may concern:*

Be it known that I, DANIEL G. GREENE, of North Bridgewater, in the county of Plymouth and State of Massachusetts, have invented certain new and useful Improvements in Machines for Shelling Corn, and that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

Figure 1 is a plan or top view of my improved corn-sheller. Fig. 2 is a central transverse vertical section of the same. Fig. 3 is a detail view to be hereinafter referred to.

In corn shellers as usually constructed, the roll or cylinder which shells the corn is of one diameter throughout, thereby feeding the corn-cob, which is of a tapering shape, faster at one end than the other; this has a tendency to feed the corn cob in a diagonal instead of a horizontal direction and is consequently frequently crushed or broken, and thereby also takes off the chaff which accumulates and chokes the machine. In the present invention a tapering feeding and shelling cylinder is used adapted to the shape of the corn-cob, which, by this means is fed through the machine and kept under all circumstances in a horizontal position, while also concave shells or guards fitted with teeth and arranged upon yielding elastic bearings are adapted to the tapering feeding cylinder and keep the ears of corn in contact therewith. These shells or guards being arranged upon yielding elastic bearings prevent the machine from becoming choked, as they readily yield to any obstruction, while they also form a gage to adapt the machine to different sizes of ears. The yielding guards or shells are divided underneath the tapering cylinder, and formed with bridge slats that extend across the space between them, whereby the corn as fast as shelled is allowed to drop through the spaces between the slats, while the slats prevent the cob from dropping through. The cob is thus made to travel around the shelling cylinder before it is permitted to escape, which insures the entire removal of the corn from it.

I would remark that I am aware that a double tapering cylinder, for shelling corn, was patented by Jas. Ross, April 12, 1833, and therefore I make no claim to said device. But the special combination and arrangement of parts, herein shown, I believe to be new.

*a a a* in the drawings represents the supporting framework of the machine; *b b* is a cylinder or roll of tapering shape with teeth, *c c*, &c., inserted in spiral directions therein; *d d'* are concave shaped shells or guards extending nearly around the tapering roll *b b*. These shells or guards are separated at the bottom and formed with slats *e, e*, &c. Fig. 3 that extend across the space between them. The inner surface of the shell or guard *d'* is furnished with teeth *f, f*, &c. The bearings of the guards *d, d'* play up and down in slots *f', f'* Fig. 2 and rest upon springs *g, g*. The guard *d'* that first receives the corn is attached at the top to spiral springs *h h* that draw it toward the feeding cylinder *b b*.

*i i* is a spout or conductor that receives the corn as fast as it is removed from the cob.

From the foregoing description it will be seen that the tapering feeding roll *b b* will keep the ear of corn always in a horizontal position while it is pressing it against the teeth of the guard *d'* and thereby prevent the corn-cob from being forced into a diagonal position across the feeding roll and crushed or broken, or the chaff removed, as one end of the corn cob will travel as fast as the other. The elastic or yielding guards readily give way to any obstruction and at the same time keep the ear of corn always in contact with the shelling roll *b b*, while by their being separated at the bottom and furnished with bridge slats *e, e*, (that can be attached to either or both guards) the corn, as fast as shelled, will drop through the spaces between the said slats and the cob be prevented from passing out until it has been forced around the entire inner surface of the guards and all the corn removed from it.

My improved corn sheller as above described is adapted to all sizes of corn, and cannot become obstructed or filled with chaff as the guards around the feeding cylinder readily yield to any extra pressure upon them, and also hold the corn-cob by an elastic pressure against the tapering roll.

The machine is further adapted to keeping itself clear by separating the yielding guards at the bottom as described.

Having thus described my improvements I shall state my claim as follows:

The arrangement of the single tapering roll ($b$) concave shells ($d\ d'$), slots ($f, f'$), springs ($g, h$), and spout ($i$), as herein shown and described, whereby the ear of corn is always kept in a horizontal position, and the cob is prevented from being forced diagonally under the roll and is thus saved from being crushed or broken, together with other advantages, all as set forth.

DANIEL G. GREENE.

Witnesses:
 GEO. E. BRYANT,
 GEO. W. BRYANT.